US006738148B2

(12) United States Patent
Dunne et al.

(10) Patent No.: US 6,738,148 B2
(45) Date of Patent: May 18, 2004

(54) UPPER STEM DIAMETER MEASUREMENT AND BASAL AREA DETERMINATION DEVICE AND METHOD FOR UTILIZATION IN TIMBER CRUISING APPLICATIONS

(75) Inventors: Jeremy G. Dunne, Highlands Ranch, CO (US); William R. Carr, Missoula, MT (US)

(73) Assignees: Laser Technology, Inc., Centennial, CO (US); Kama-Tech (HK) Limited, Hong Kong (CN)

( * ) Notice: Subject to any disclaimer, the term of this patent is extended or adjusted under 35 U.S.C. 154(b) by 481 days.

(21) Appl. No.: 09/883,677

(22) Filed: Jun. 18, 2001

(65) Prior Publication Data

US 2002/0191198 A1 Dec. 19, 2002

(51) Int. Cl.$^7$ .............................................. G01B 11/02
(52) U.S. Cl. ............. 356/635; 250/559.24; 250/559.25; 348/135
(58) Field of Search ................................ 356/625–640, 356/247, 20, 21, 251, 252; 250/559.22–559.25; 348/135–142; 33/706, 707, 501.05, 501.06

(56) References Cited

U.S. PATENT DOCUMENTS

| | | | | |
|---|---|---|---|---|
| 3,806,253 | A | * 4/1974 | Denton | 356/601 |
| 3,852,579 | A | * 12/1974 | Sohn et al. | 702/167 |
| 4,497,117 | A | * 2/1985 | Wrobley et al. | 33/276 |
| 5,020,902 | A | * 6/1991 | Kits van Heyningen et al. | 356/21 |
| 5,949,086 | A | * 9/1999 | Reponen et al. | 250/559.25 |
| 6,466,306 | B1 | * 10/2002 | Davis | 356/4.03 |
| 6,583,860 | B2 | * 6/2003 | Haga | 356/3.01 |
| 2003/0160974 | A1 | * 8/2003 | Demeyere et al. | 356/635 |

OTHER PUBLICATIONS

Criterion™ Series Hand Held Survey Lasers, Laser Technology, Inc.
Criterion 400 Survey Laser Operator's Guide, Laser Technology, Inc., Aug. 1992, pp. 1–1 through D–15.
Total height of a single tree, http://www.anu.edu.au/Forestry/mensuration/totalhgt.htm, Oct, 23, 2000, pp. 1–2.
Stanton, Bill, Measuring The Volume of Standing Trees with A Scale Stick, http://www.ces.ncsu.edu/nreos/forest/woodland/won–05.html, Oct, 30, 2000, pp. 1–3.

(List continued on next page.)

Primary Examiner—Richard A. Rosenberger
Assistant Examiner—Vincent Barth
(74) Attorney, Agent, or Firm—William J. Kubida; Hogan & Hartson LLP (57) ABSTRACT

An upper stem diameter measurement ("USDM") and basal area determination device for timber cruising operations incorporates a viewing window in which are projected variable, visual brackets for manual alignment by the user, or automatic setting under processor section control, with the left and right sides of a target tree stem or trunk. The device further includes a built-in inclinometer such that computations of height and stem diameter can be automatically adjusted depending on the user's line of sight with respect to a horizontal plane. In a preferred embodiment, a user actuatable keypad is provided for inputting data, such as a desired operational mode, a specified basal area factor and the like, a user viewable display as well as control buttons for adjusting the visual brackets and indicating an acceptance of various of the device parameters and operational characteristics.

46 Claims, 5 Drawing Sheets

OTHER PUBLICATIONS

Larsen, David, Natural Resource Biometrics, http://pine.snr.missouri.edu/natr211/topics/dbh.html, Aug. 17, 1998, pp. 1–2.

Comparing Hypsometers and other instruments for measuring height©, http://www.anu.edu.au/Forestry/mensuration/BrackandWood1998/HGTCOMP.HTM, Jan. 7, 1997, pp. 1–2.

Tools for measuring tree height, http://www.anu.edu.au/Forestry/mensuration/toolshgt.htm, 6/99, pp. 1–3.

Measuring the tree trunk©, http://www.anu.edu.au/Forestry/mensuration/BrackandWood1998/DBHOB.HTM, Dec. 20, 1996, pp. 1–4.

Techniques for measuring height of a standing tree, http://www.anu.au/Forestry/mensuration/height.htm, 6/99, pp. 1–3.

Tools for measuring tree diameter, http://www.anu.edu.au/Forestry/mensuration/toolsd.htm, 6/99, pp. 1–2.

Merchantable height of a single tree, http://www.anu.edu.au/Forestry/mensuration/merchhgt.htm, 6/99, p. 1.

Zuuring, Hans, Week 2 Mensuration Notes, http://www.forestry.umt.edu/academics/courses/For202/Week2 Notes.htm, Feb. 10, 2000, pp. 1–8.

* cited by examiner

*Fig. 4B*
HEIGHT = AB − AC
= OA × (tan(u) − tan(d))

*Fig. 4D*
$$\text{HEIGHT} = \sqrt{(L_1^2 + L_2^2 - 2L_1L_2\cos(u-d))}$$

*Fig. 4A*
HEIGHT = AC + CB
= OC × (tan(u) + tan(d))

*Fig. 4C*
$$\text{HEIGHT} = \sqrt{(L_1^2 + L_2^2 - 2L_1L_2\cos(u+d))}$$

UPPER STEM DIAMETER MEASUREMENT AND BASAL AREA DETERMINATION DEVICE AND METHOD FOR UTILIZATION IN TIMBER CRUISING APPLICATIONS

BACKGROUND OF THE INVENTION

The present invention relates, in general, to the field of standing timber diameter measurement and basal area determination devices and methods. More particularly, the present invention relates to an upper stem diameter measurement ("USDM") and basal area determination device and method of especial utility in determining the merchantable volume of standing trees in timber cruising operations.

Among the steps necessary in planning management activity with respect to forested land is to conduct an inventory of available resources, (sometimes referred to as timber "cruising"), in which the available timber volume, or board feet of lumber, among harvestable trees is determined. In this regard, direct or indirect measurements of a particular tree's height and diameter may be taken with or without a determination of 80% stem diameter at breast height ("DBH") or other recordation of tree stem height at a predetermined fixed stem width above its base. Other cruising operations may include a determination as to which trees within a specified area of observation are determined to be "in" or "out" with respect to subsequent harvesting based upon a specified basal area function.

Currently, a number of tools and types of equipment are available for undertaking these types of measurements including: tape measures, calipers and scale sticks for measuring diameters, all of which require the timber cruiser to physically access each individual tree. Determinations of tree heights may be made remotely by existing hypsometers while distance measurements can be effectuated by any number of laser-based distance measuring and ranging instruments.

Certain other instruments are currently available which attempt to combine a number of cruising functions into a single portable device. Representative of these is the Spiegel Relaskop and Telerelaskop (Salzburg, Austria) which are relatively awkward to use, failure prone in the field and ultimately imprecise optical/mechanical instruments for measuring range, tree height, diameter and certain tree stand parameters. A more robust and accurate instrument for timber cruising applications is the Criterion 400 series of survey lasers manufactured and distributed by Laser Technology, Inc., Englewood, Colo., assignee of the present invention.

However, a need still exists for a compact, portable upper stem diameter measurement ("USDM") device which is rugged and self-contained for use in determining tree stem diameter at many points along the stem, height, 80% DBH measurements and basal area function computations which may be utilized by itself or in conjunction with a commercially available laser-based range finder such as the Impulse series also available from Laser Technology, Inc.

SUMMARY OF THE INVENTION

Disclosed herein is an upper stem diameter measurement ("USDM") device which is operative to more quickly and accurately provide a user with much improved functionality over that of a conventional and relatively expensive optical/mechanical Spiegel Relaskop or Telerelaskop for use in timber cruising activities. In an exemplary embodiment disclosed herein, the device may be used alone or in operative association with a laser-based distance measuring and ranging instrument which may be coupled to it by means of a built in serial port.

In one implementation of the present invention, a viewing window is provided in which are projected variable, visual brackets for alignment by the user, or automatic adjustment under processor section control, with the left and right sides of a target tree stem or trunk. The device further includes a built-in inclinometer such that computations of height and stem diameter can be automatically adjusted depending on the user's line of sight with respect to a horizontal plane. A preferred embodiment disclosed herein includes a user actuatable keypad for inputting data, such as a desired operational mode, a specified basal area factor and the like, a user viewable display as well as control buttons for adjusting the visual brackets and indicating an acceptance of various of the device parameters and operational characteristics.

Operationally, in addition to determination of tree height (of substantially vertical or leaning trees) from an observation point either above or below the base of the tree, the USDM device of the present invention is operative to determine tree diameter by visually bracketing the perceived diameter of the tree at a given point on the tree. With knowledge of the horizontal distance to the tree and the vertical angle of the line of sight to the selected point, the height and diameter of the tree at that point can be automatically determined. When used in an 80% DBH (or fixed width at the upper stem) mode, the device automatically sets the visual brackets to the selected value. The user then aims the device up the tree stem until the brackets are aligned with the left and right sides of the stem as viewed between the brackets and the height of the tree at which 80% DBH (or a fixed width) occurs is calculated and displayed. For use in a function in which basal area is to be determined, the basal area factor is entered into the keypad whereupon the device automatically sets the visual brackets a predetermined distance apart corresponding to a fixed angular subtense in the horizontal plane. The device is then aimed at a series of trees which, if their perceived diameter is greater than or equal to what is shown in the visually adjacent brackets, are then considered to be "in", otherwise they are determined to be "out" as being too small.

Particularly disclosed herein is a device for remotely determining a diameter of a substantially conical object which comprises a display for superimposing a user viewable image over a face of the object along a desired line of sight. The display produces visually adjustable brackets for alignment with the perceived left and right sides of the object face. A user input device is provided for manually aligning the adjustable brackets with the left and right sides of the object face. An inclinometer is also provided for producing an electrical indication of a vertical angle of the line of sight while a processor section calculates the diameter of the object based upon a known horizontal distance to the object, the electrical indication of the vertical angle of the line of sight and a separation between the adjustable brackets.

Further disclosed herein is a device for determining a height of a substantially conical object at which a selected diameter occurs. The device comprises a display for superimposing a user viewable image over a face of the object along a desired line of sight, with the display producing visually adjustable brackets for alignment with perceived left and right sides of the object face. A user input device allows for manual entry of a selected diameter while an inclinometer produces an electrical indication of an angle of the line of sight. A processor section automatically adjusts a spacing between the brackets based upon a known horizontal distance to the object, the electrical indication of the angle of the line of sight and the selected diameter.

Also disclosed herein is a device for determining a basal area of a stand of trees which comprises a display for superimposing a user viewable image over a face of selected ones of the stand of trees along a desired line of sight. The display produces visually adjustable brackets for alignment with perceived left and right sides of the face of the selected ones of the stand of trees. A user input device is provided for manually entering a selected basal area factor and an inclinometer produces an electrical indication of a vertical angle of the line of sight. A processor section automatically adjusts a spacing between the brackets based upon the electrical indication of the vertical angle of the line of sight and the selected basal area factor to provide a fixed angular subtense in the horizontal plane.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A REPRESENTATIVE EMBODIMENT

Figure 1A:
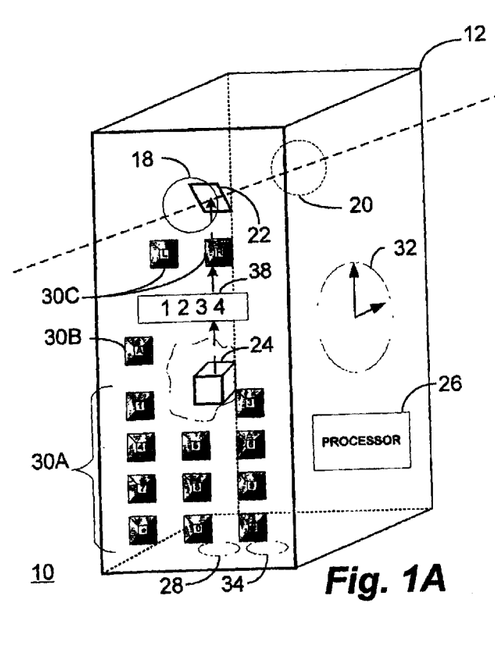
FIG. 1A is a simplified representative illustration of the primary components of a portable, battery powered, USDM device in accordance with an exemplary embodiment of the present invention for use in timber cruising operations.

With reference now to FIG. 1A, a simplified representative illustration of the primary components of a portable, battery powered, USDM device 10 in accordance with an exemplary embodiment of the present invention is shown for potential use in timber cruising operations.

The device 10 comprises a self-contained, portable, lightweight unit enclosed in a housing 12 which includes all of the mechanical, electrical and optical components thereof. In operation, a user may position the device 10 at an observation point "O" in order to view a particular target tree 14 stem (or trunk) 16 along a line of sight (represented by the dashed line) passing through apertures 18 and 20. A partial mirror 22 is positioned along the line of sight between apertures 18 and 20 in order to receive and display to the user, visual brackets and/or other indicator signals projected by a backlit liquid crystal display ("LCD") 24 which are then effectively superimposed upon the view of the target tree 14. It should be noted that other methods of effectively superimposing the visual brackets and/or other indicator signals upon the view of a target tree 14 may be utilized without departing from the scope of the present invention as disclosed herein.

The USDM device 10 further comprises a processor section 26 for controlling the display of the visual brackets projected by the LCD 24 as well as other functions of the device 10 as will be more fully described hereinafter. Information may be provided to the processor section 26 of the device 10 in electrical form, as well as to its on-board memory, through an input serial port 28 as shown. For example, this serial port 28 may be utilized to electrically attach a conventional laser-based ranging and distance measurement determining device, such as any of the Criterion or Impulse devices available from Laser Technology, Inc., for providing direct distance measurement information to a particular tree for use in the calculation of the functions hereinafter disclosed in greater detail.

Information may also be input to the processor section 26, or on-board memory, through a number of user actuatable push button switches 30. The switches 30 may comprise an alphanumeric keypad 30A for the entry of distances, the selection of operational modes or other data; an "accept" button "A" 30B for indicating to the processor section 26 that the information presented to the user is correct or a data entry is desired; and one or more visual bracket positioning switches 30C for enabling a user to position one or both sides of the visual brackets about the perceived diameter of a target tree 14 (e.g. a left switch "L" for positioning the left most visual bracket indicator adjacent the left side 16L of the tree stem 16 and a right switch "R" for positioning the right most visual bracket indicator adjacent the right side 16R of the tree stem 16). Alternative provision and arrangements of switches may be utilized including separate "L" and "R", "UP" and "DOWN" switches for increasing and decreasing the bar graph width by individual placement of the left and right visual brackets.

Information regarding the angle of inclination of the device 10, and hence the line of sight toward a target tree 14, may be supplied to the processor section 26 through the use of a built in inclinometer 32 which may be conveniently supplied as any of a number of commercially available inclination sensing devices. Electrical signals representative of the output of data from the processor section 26 may also be supplied externally from the device 10 through an output serial port 34 (for connection to a data logger, printer, display or other computer output or data manipulation device) or otherwise presented visually to the user on a display 38 for displaying the output of calculations performed by the processor, the mode of operation selected, the information entered via the various switches 30 and the like.

Figure 1B:
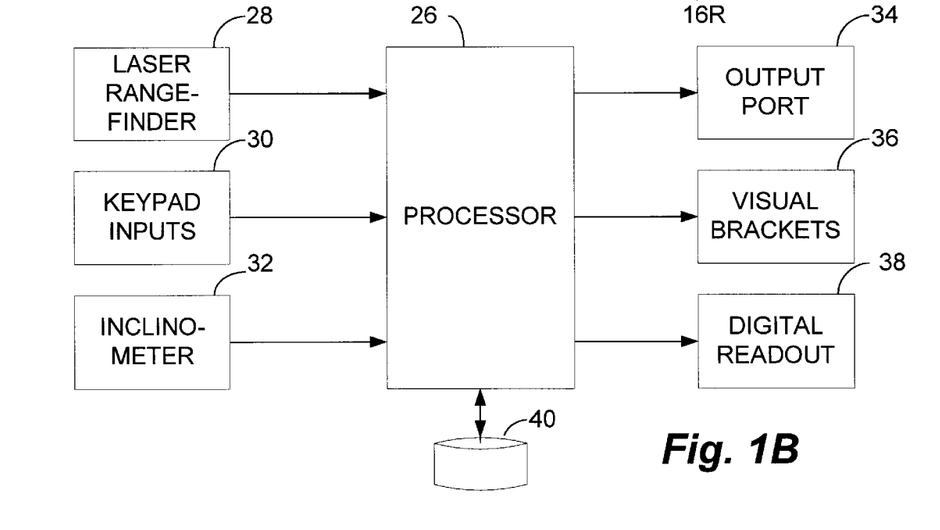
FIG. 1B is a simplified block diagram of the USDM device of the preceding figure showing certain of the various inputs to, and outputs from, the self-contained processor section thereof.

With reference additionally now to FIG. 1B, a simplified block diagram of the USDM device 10 of the preceding figure is shown illustrating certain of the various inputs to, and outputs from, the self-contained processor section 26 thereof. As previously mentioned, an input serial port 28 may be utilized to couple information output from a laser-based, radar-based or other signal transmitting and receiving distance measuring device to the processor section 26. Also, the keypad inputs 30A, 30B and 30C may also provide user input information to the processor section as well as that provided by the inclinometer 32.

Output from the processor section 26 may, as previously described, may be provided on an output port 34 as well as to the LCD 24 to provide the user viewable visual brackets 36 which will be described in greater detail hereinafter. In addition to performing the various calculations of the device 10 based upon the various inputs received, the processor section 26 may also provide user viewable information on the digital readout 38 of the device 10. Information necessary for implementing the calculations performed by the processor section 26 may be stored in and/or read from an integral memory section in the form of microcoded instructions, read only memory and the like or an on-device 10 memory database 40 into which results of such calculations may be input as well.

Figures 2A, 2B, 2C:
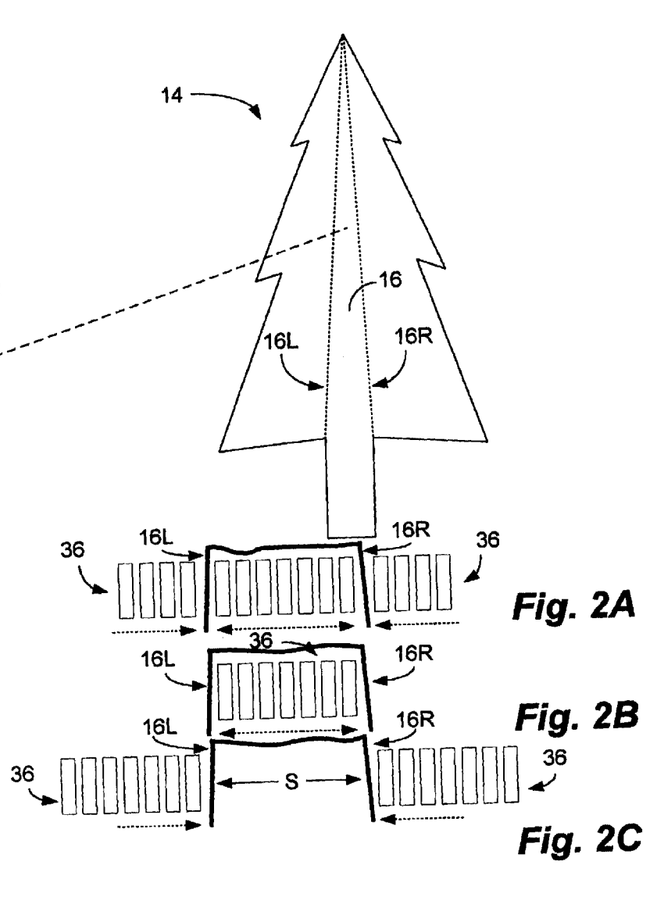
FIGS. 2A through 2C inclusive are a number of representative examples of differing types of user viewable bracket indicators which may be visually placed by a user adjoining the sides of a perceived tree diameter "S" in the operation of the USDM device of the preceding figures when aimed at a target tree stem at one or more points therealong.

With reference additionally now to FIGS. 2A through 2C, a number of representative examples of differing types of user viewable bracket indicators 36 are shown. In a particular embodiment, the brackets 36 may comprise a number of relatively small, closely spaced, selectively illuminatable LCD elements in the form, for example, of a substantially linearly disposed "bar graph", which may be visually placed by a user adjoining the sides 16L and 16R of a target tree 14 stem 16 as viewed in the partial mirror 22. In FIG. 2A, the brackets 36 may visually present a pair of non-viewable element gaps in a series of otherwise viewed elements which may be positioned adjacent the sides 16L and 16R of the target tree in response to the user actuation of the buttons 30C or as otherwise determined by the processor section 26. Alternatively, the gaps may themselves comprise viewable elements while at least a portion of the remaining adjacent viewable elements remain unviewable. In FIG. 2B, an alternative arrangement of LCD elements is shown wherein the number of elements viewed is selected to correspond with the perceived stem diameter "S" of the target tree 14. Alternatively, in FIG. 2C, another arrangement of LCD elements is shown wherein the number of elements not viewed is made to correspond with the perceived stem diameter "S". With all of the implementation of brackets 36 shown, the purpose is to accurately portray the perceived stem diameter "S" to the user with as much precision as is possible. While other means for portraying visual brackets are, of course, possible without departing from the spirit and scope of the present invention, for example, the use of light emitting diodes ("LEDs"), the foregoing have been found to be particular efficacious in this regard.

Figure 3A:
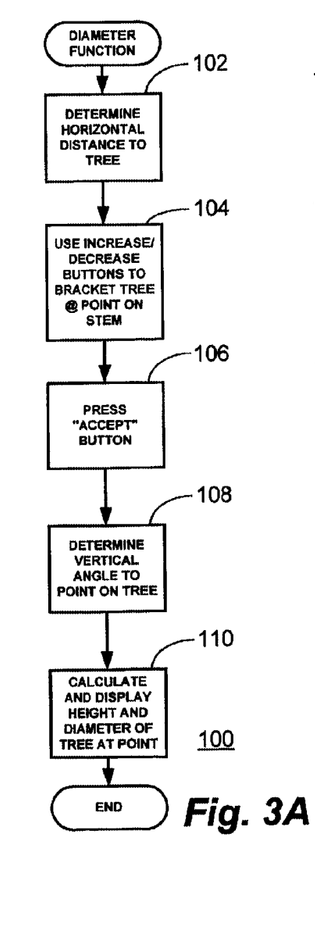
FIG. 3A is a logic flow chart for a possible utilization of the USDM device of the present invention in a tree diameter function mode of operation.

With reference additionally now to FIG. 3A, a logic flow chart for a possible utilization of the USDM device 10 of the present invention in a tree diameter function mode of operation 100 is shown. The tree diameter determining mode of operation 100 may be selected by a user of the device 10 through inputs placed on the keypad 30 as appropriate and begins with the entry (either manually through the alphanumeric keypad 30A, through the use of a laser range finder or other device coupled to the input serial port 28 or other means) of the horizontal distance to a target tree 14 stem 16 at step 102.

At step 104, the user then uses the increase/decrease bracket buttons (e.g. "L" and "R" buttons 30C) to position the visual brackets 36 adjoining the sides 16L and 16R at a desired point on the stem 16. When this has been effectuated, the user then depresses the "Accept" button 30B at step 106 to indicate to the processor section 26 that the brackets 36 have been correctly placed adjoining the visual image of the perceived stem diameter "S" at the desired point on the tree stem 16. At step 108, the processor section 26 takes into account the angle of inclination (or declination) of the line of sight from the observer/user of the device 10 to the selected point on the tree stem 16 as determined by the inclinometer 32. Finally, at step 110, the processor section 26 calculates and displays (e.g. on display 38 in English, metric or other units) the actual height and diameter of the tree at the selected point. This information may also be added to the database 40 or output on the serial output port 34 for subsequent display and/or processing.

Figure 3B:
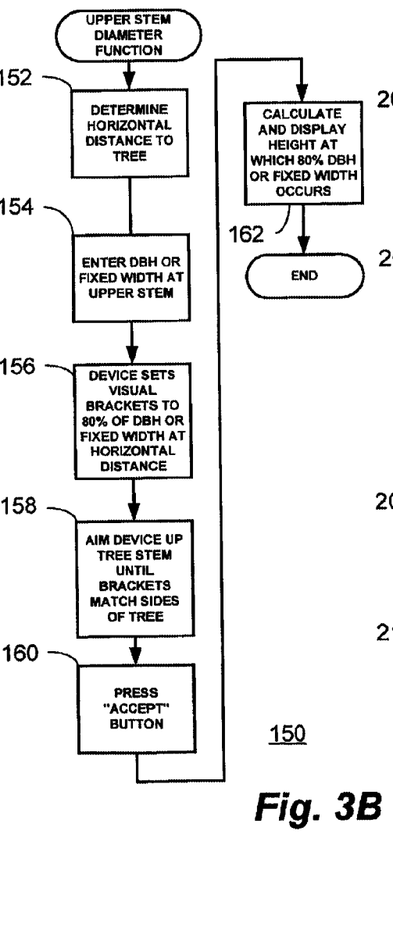
FIG. 3B is another logic flow chart for a possible utilization of the USDM device of the present invention in an upper stem diameter or 80% of diameter breast height ("DBH") mode of operation.

With reference additionally now to FIG. 3B, another logic flow chart for a possible utilization of the USDM device 10 of the present invention in an upper stem diameter, or 80% of diameter breast height ("DBH"), mode of operation 150 is shown. Either the fixed stem width or 80% of DBH determining mode of operation 150 may be selected by a user of the device 10 through inputs placed on the keypad 30 as appropriate and again begins with the entry (either manually through the alphanumeric keypad 30A, through the use of a laser range finder or other device coupled to the input serial port 28 or other means) of the horizontal distance to a target tree 14 stem 16 at step 152. The desired function as to DBH or a particular upper stem width is entered by the user of the device 10 at step 154.

In this operational mode, the processor section 26 of the device 10 automatically sets the visual brackets 36 to 80% of DBH (or the selected upper stem width) at step 156 for the particular horizontal distance to the target tree 14. At step 158, the user then aims the device 10 up the tree stem 16 until the visual brackets 36 presented are aligned with the left and right sides 16L and 16R of the target tree. The "Accept" button 30B is then depressed at step 160 and the processor section calculates and displays the height at which 80% of DBH (or the fixed width selected) occurs at step 162 based upon calculation of the height of the target tree at that point based upon the known horizontal distance to the tree and the angle of inclination (or declination) indicated by the inclinometer 32. Again, this information may also be added to the database 40 or output on the serial output port 34 for subsequent display and/or processing.

Figure 3C:
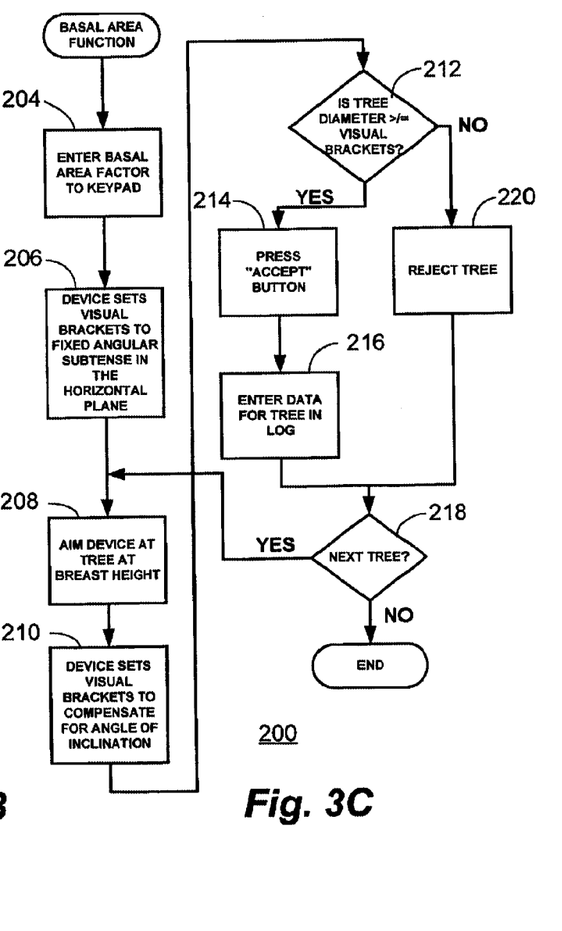
FIG. 3C is a further logic flow chart for a possible utilization of the USDM device of the present invention in a basal area function mode of operation.

With reference additionally now to FIG. 3C, a further logic flow chart for a possible utilization of the USDM device 10 of the present invention in a basal area function mode of operation 200 is shown. This mode of operation 200 may also be selected by a user of the device 10 through inputs placed on the keypad 30 as appropriate. At step 204, the user enters the desired basal area factor to be used to the alphanumeric keypad 30A and thereafter, at step 206, the device 10 processor section 26 automatically sets the visual brackets 36 to a fixed angular subtense in the horizontal plane (corresponding to a calculated fixed angle "α") to a particular one of the target trees 14 that can be viewed by the observer/user at that point. At step 208, the user can then aim the device 10 at a particular tree at breast height and, at step 210, the processor section 26 of the device 10 then automatically sets the visual brackets 36 to compensate for the angle of inclination (or declination) of the user's line of sight as indicated by the inclinometer 32.

At decision step 212, if the perceived tree diameter is greater than or equal to the diameter indicated by the brackets 36 at the selected point on the stem 16, the "Accept" button is depressed at step 214 and the data for that particular tree is then entered into a log (e.g. database 40) or otherwise output on the output serial port 34 at step 216. If information for another tree still remains to be determined as part of the basal area function operation 200, at decision step 218 the user again aims the device 10 at the next tree at step 208 and the process 200 continues. Alternatively, if at decision step 212 the tree diameter is less than that indicated by the visual brackets 36, the tree may be considered rejected prior to the process again considering decision step 218.

Figure 4A:
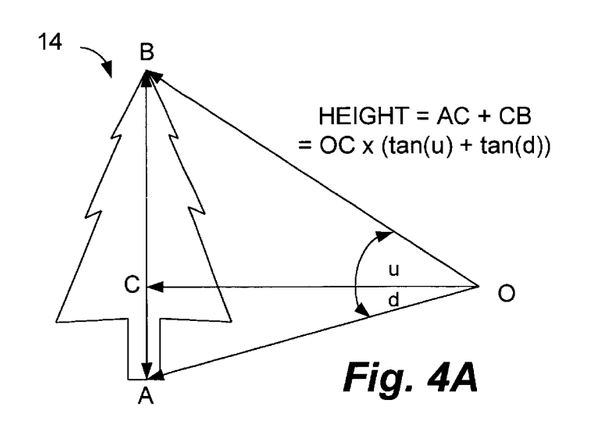
FIG. 4A is a representative illustration of the use of the USDM device of the preceding figures as a hypsometer in determining the height of a substantially vertically standing tree when the observer at position "O" is standing at a point above the base of the target tree.

With reference additionally now to FIG. 4A, a representative illustration of the use of the USDM device 10 of the preceding figures as a hypsometer is shown in determining the height of a substantially vertically standing tree 14 when the observer at position "O" is standing at a point above the base of the target tree. In this regard, the horizontal distance to the target tree at point "C" is either known or measured through any of the means previously described or otherwise used in the timber industry. The user may first aim the device 10 at the base "A" of the target tree 14 and the processor section 26 determines the angle of declination "d" (down) to that point based upon input received from the inclinometer. Likewise, the user may then aim the device 10 at the upper stem "B" of the target tree 14 and the processor section 26 determines the angle of inclination "u" (up) to that point again based upon input received from the inclinometer. Based upon these readings, the device 10 is operative to calculate and display the height of the tree 14 (AC+CB) as the horizontal distance "OC" times the quantity equal to the tangent of angle "u" plus the tangent of angle "d" as shown.

Figure 4B:
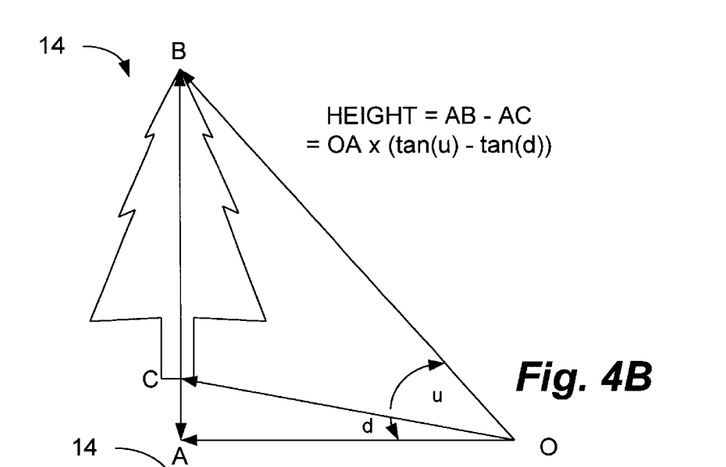
FIG. 4B is another representative illustration of the use of the USDM device in determining the height of a substantially vertically standing tree when the observer at position "O" is standing at a point below the base of the target tree.

With reference additionally now to FIG. 4B, another representative illustration of the use of the USDM device 10 is shown in determining the height of a substantially vertically standing tree 14 when the observer at position "O" is standing at a point below the base of the target tree. In this example, the horizontal distance to the target tree at point "A" below the tree base is again known or measured. As before, the user at point "O" may first aim the device 10 at the base "C" of the target tree 14 and the processor section 26 determines the angle of declination "d" (down) from that point to the point "A" based upon input received from the inclinometer. Likewise, the user may then aim the device 10 at the upper stem "B" of the target tree 14 and the processor section 26 determines the angle of inclination "u" (up) from point "C" to that point again based upon input received from the inclinometer. Based upon these readings, the device 10 is operative to calculate and display the height of the tree 14 (AB-AC) as the horizontal distance "OA" times the quantity equal to the tangent of angle "u" minus the tangent of angle "d" as shown.

Figure 4C:
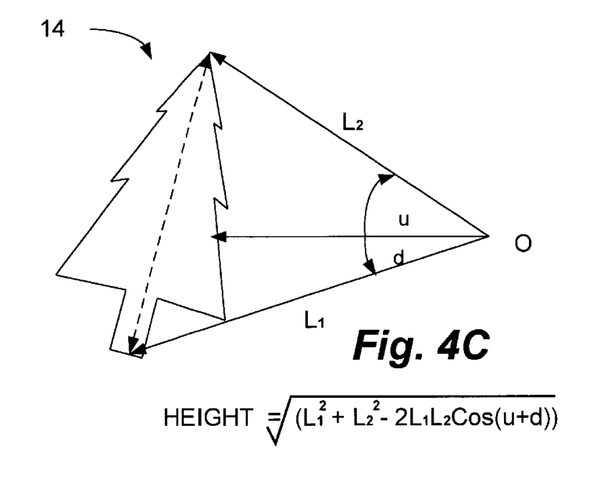
FIG. 4C is a further representative illustration of the use of the USDM device in determining the height of a leaning tree when the observer at position "O" is standing at a point above the base of the target tree.

With reference additionally now to FIG. 4C, a further representative illustration of the use of the USDM device 10 is shown in determining the height of a leaning tree 14 when the observer at position "O" is standing at a point above the base of the target tree. In this example, the distances to the bottom and top of the target tree 14 are measured as $L_1$ and $L_2$ respectively and the processor section 26 determines the angle of declination "d" (down) from the horizontal along line $L_1$ and the angle of inclination "u" (up) along line $L_2$ based upon input received from the inclinometer. Based upon these readings, the device 10 is operative to calculate and display the height of the tree 14 in accordance with the formula shown.

Figure 4D:
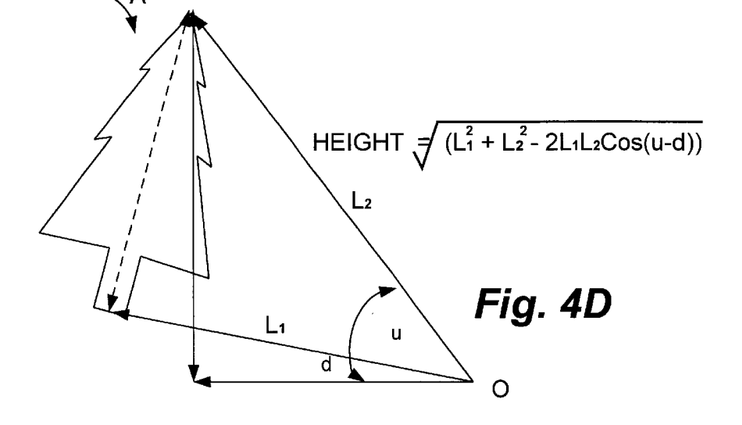
FIG. 4D is a still further representative illustration of the use of the USDM device in determining the height of a leaning tree when the observer at position "O" is standing at a point below the base of the target tree.

With reference additionally now to FIG. 4D, a still further representative illustration of the use of the USDM device 10 is shown in determining the height of a leaning tree when the observer at position "O" is standing at a point below the base of the target tree. In this example, the distances $L_1$ and $L_2$ to the bottom and top of the target tree 14 are again measured as before. As before, the user at point "O" may first aim the device 10 at the base of the tree 14 and the processor section 26 determines the angle of declination "d" (down) from that point to the horizontal based upon input received from the inclinometer. Likewise, the user may then aim the device 10 at the upper stem tip, on top, of the target tree 14 and the processor section 26 determines the angle of inclination "u" (up) from a line to the base of the tree 14 at that point again based upon input received from the inclinometer. Based upon these readings, the device 10 is operative to calculate and display the height of the tree 14 in accordance with the formula shown.

Figure 5A:
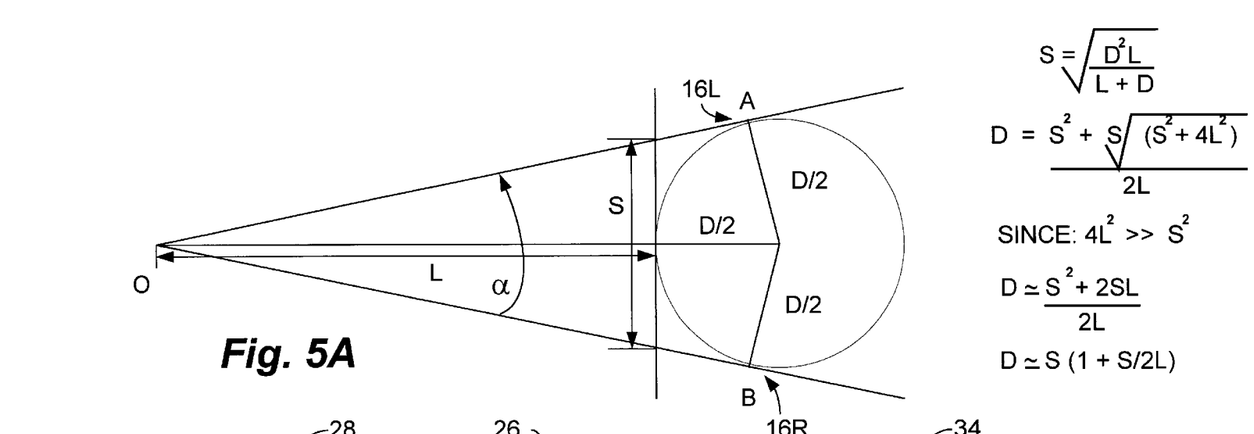
FIG. 5A is an illustration of the use of the USDM device of the present invention in calculating a target tree's actual diameter "D" from a perceived stem diameter "S" when viewed from a position "O" a horizontal distance "L" from the tree.

With reference additionally now to FIG. 5A, an illustration of the use of the USDM device 10 of the present invention is shown in calculating a target tree's actual diameter "D" from the perceived stem diameter "S" when viewed from a position "O" a horizontal distance "L" from the face of the tree. This figure indicates how the device 10 may automatically derive the actual diameter "D" of a target tree 14 based upon the perceived diameter "S" as viewed by the visual brackets 36. In this regard, for a given angle "α" from the observer at point "O", the perceived diameter "S" of the tree is seen at the point on the circumference of the tree stem at its face a distance "L". The line of sight for the observer provides a view of the target tree 14 left side 16L at point "A" and the right side 16R at point "B". Since the distance "L" is known (or can otherwise be determined), as well as the separation of the visual brackets along with the focal length of the optical system the unknown actual diameter "D" can be determined by means of the processor section 26.

Figures 5B, 6:
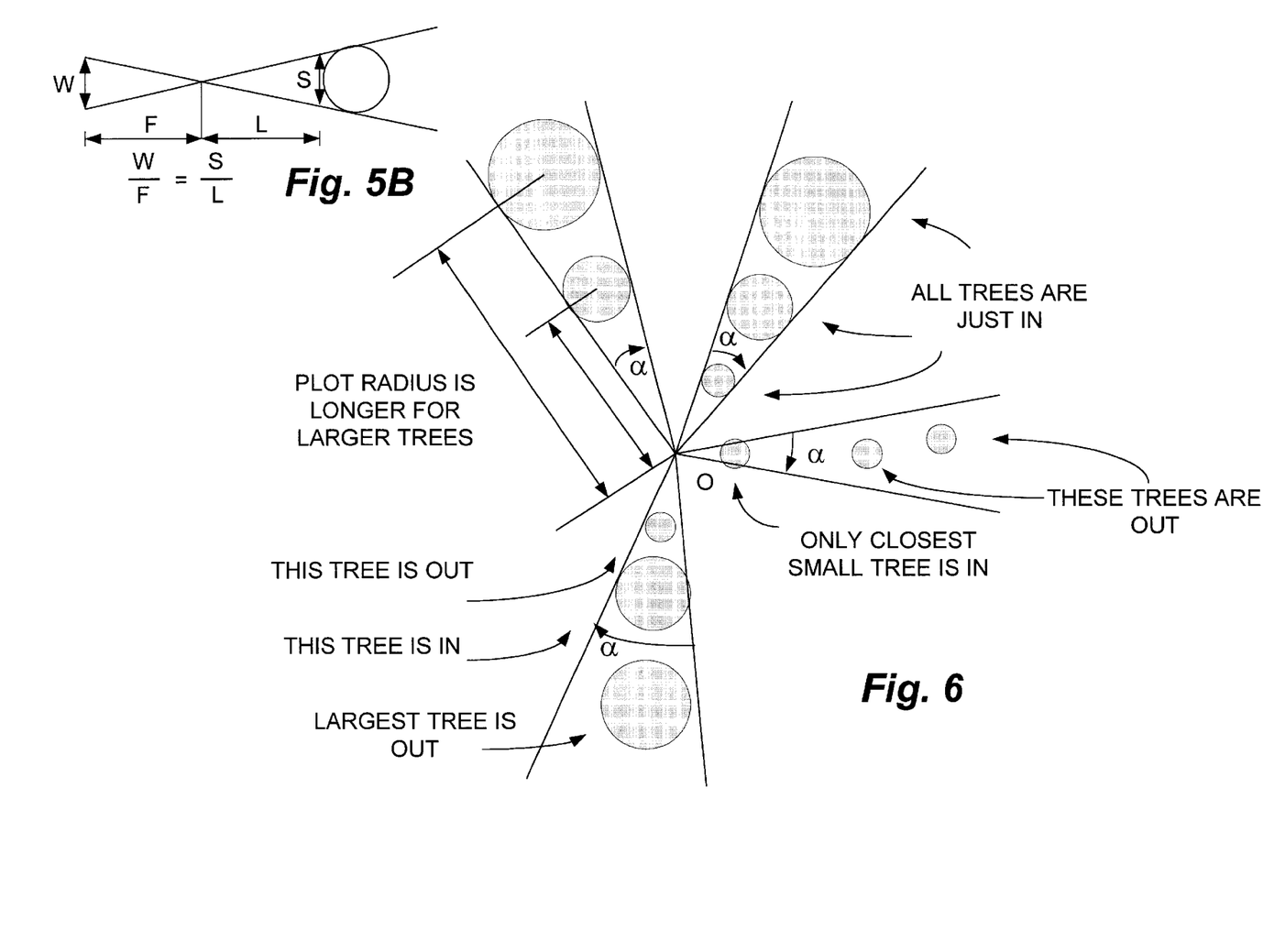
FIG. 5B is a simplified view of flat field optical system.
FIG. 6 is an illustration of the use of the USDM device of the present invention in aiding the determination of "tree in", "tree out" timber cruising operations.

With reference additionally now to FIG. 5B, a simplified view of a flat field optical system is shown wherein "W" is the distance between the visual brackets, "F" is the focal length of the optical system, "L" is the distance to the tree face and "S" is the apparent diameter of the tree. Solving the equation shown for "S", then:

$$S = WL/F.$$

Therefore, $$D \sim (WL/F)*(1+W/2F)$$

With reference additionally now to FIG. 6, an illustration of the use of the USDM device 10 of the present invention is shown in aiding the determination of "tree in", "tree out" timber cruising operations. In this example, various situations are presented wherein, for a given angle "α" (where the correct angle α is referred to the horizontal plane using the inclinometer 32. Various trees of varying diameter might be determined to be "in" or "out" in a basal area function operation 200 as previously described with respect to FIG. 3C.

While there have been described above the principles of the present invention in conjunction with specific structure and circuit elements, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A device for remotely determining a diameter of a substantially conical object comprising:
   a display for superimposing a user viewable image over a face of said conical object along a desired line of sight, said display producing visually adjustable brackets for alignment with perceived left and right sides of said object face;
   a user input device for manually aligning said adjustable brackets with said left and right sides of said object face;
   an inclinometer for producing an electrical indication of a vertical angle of said line of sight; and
   a processor section for calculating said diameter of said object based upon a known horizontal distance to said object, said electrical indication of said vertical angle of said line of sight and a separation between said adjustable brackets.

2. The device of claim 1 wherein said display comprises at least one backlit liquid crystal display.

3. The device of claim 2 wherein said at least one liquid crystal display projects said visually adjustable brackets onto a partial mirror intersecting said desired line of sight.

4. The device of claim 1 wherein said adjustable brackets comprise a plurality of substantially linearly disposed, spaced apart, selectively viewable elements.

5. The device of claim 4 wherein a first subset of said viewable elements perceived as medial of said left and right sides of said object may be viewed while a second subset of said viewable elements perceived as lateral of said left and right sides of said object are not viewed.

6. The device of claim 4 wherein a first subset of said viewable elements perceived as medial of said left and right sides of said object may be not viewed while a second subset of said viewable elements perceived as lateral of said left and right sides of said object are viewed.

7. The device of claim 4 wherein a first subset of said viewable elements perceived as coincident with said left and right sides of said object may be not viewed, while a second subset of said viewable elements perceived as medial and lateral of said left and right sides of said object are viewed.

8. The device of claim 4 wherein a first subset of said viewable elements perceived as coincident with said left and right sides of said object may be viewed, while a second subset of said viewable elements perceived as medial and lateral of said left and right sides of said object are not viewed.

9. The device of claim 1 wherein said user input device comprises at least first and second switches for aligning said adjustable brackets with said left and right sides of said object face.

10. The device of claim 1 wherein said user input device further comprises an alphanumeric keypad for manually entering data to said device.

11. The device of claim 1 further comprising:
    a switch for indicating to said processor section when said adjustable brackets are aligned with said left and right sides of said object face.

12. The device of claim 1 further comprising:
    an input port for providing information indicative of said known horizontal distance to said processor section.

13. The device of claim 12 further comprising:
    a laser-based distance measuring device coupled to said input port.

14. The device of claim 1 further comprising an output port coupled to said processor section for providing an output signal at least indicative of said calculated diameter of said object.

15. The device of claim 1 further comprising:
    a user viewable readout coupled to said processor section for indicating at least said calculated diameter of said object.

16. The device of claim 1 further comprising:
    a data storage element coupled to said processor for storing at least said calculated diameter of said object.

17. A device for determining a height of a substantially conical object at which a selected diameter occurs comprising:
    a display for superimposing a user viewable image over a face of said conical object along a desired line of sight, said display producing visually adjustable brackets for alignment with perceived left and right sides of said object face;
    a user input device for manually entering said selected diameter;
    an inclinometer for producing an electrical indication of a vertical angle of said line of sight; and
    a processor section for automatically adjusting a spacing between said brackets based upon a known horizontal distance to said object, said electrical indication of said vertical angle of said line of sight and said selected diameter.

18. The device of claim 17 wherein said display comprises at least one backlit liquid crystal display.

19. The device of claim 18 wherein said at least one liquid crystal display projects said visually adjustable brackets onto a partial mirror intersecting said desired line of sight.

20. The device of claim 17 wherein said adjustable brackets comprise a plurality of substantially linearly disposed, spaced apart, selectively viewable elements.

21. The device of claim 20 wherein a first subset of said viewable elements perceived as medial of said left and right sides of said object may be viewed while a second subset of said viewable elements perceived as lateral of said left and right sides of said object are not viewed.

22. The device of claim 20 wherein a first subset of said viewable elements perceived as medial of said left and right sides of said object may be not viewed while a second subset of said viewable elements perceived as lateral of said left and right sides of said object are viewed.

23. The device of claim 20 wherein a first subset of said viewable elements perceived as coincident with said left and right sides of said object may be not viewed, while a second subset of said viewable elements perceived as medial and lateral of said left and right sides of said object are viewed.

24. The device of claim 20 wherein a first subset of said viewable elements perceived as coincident with said left and right sides of said object may be viewed, while a second subset of said viewable elements perceived as medial and lateral of said left and right sides of said object are not viewed.

25. The device of claim 17 wherein said user input device further comprises an alphanumeric keypad for manually entering at least object distance data to said device.

26. The device of claim 17 further comprising:
a switch for indicating to said processor section when said adjustable brackets are aligned with said left and right sides of said object face.

27. The device of claim 17 further comprising:
an input port for providing information indicative of said known horizontal distance to said processor section.

28. The device of claim 27 further comprising:
a laser-based distance measuring device coupled to said input port.

29. The device of claim 17 further comprising an output port coupled to said processor section for providing an output signal at least indicative of said height of said substantially conical object at which a selected diameter factor occurs.

30. The device of claim 17 further comprising:
a user viewable readout coupled to said processor section for indicating at least said height of said substantially conical object at which a selected diameter factor occurs.

31. The device of claim 17 further comprising:
a data storage element coupled to said processor for storing at least said height of said substantially conical object at which a selected diameter factor occurs.

32. A device for determining a basal area of a stand of trees comprising:
a display for superimposing a user viewable image over a face of selected ones of said stand of trees along a desired line of sight, said display producing visually adjustable brackets for alignment with perceived left and right sides of said face of said selected ones of said stand of trees;
a user input device for manually entering a selected basal area factor;
an inclinometer for producing an electrical indication of a vertical angle of said line of sight; and
a processor section for automatically adjusting a spacing between said brackets based said electrical indication of said vertical angle of said line of sight and said selected basal area factor.

33. The device of claim 32 wherein said display comprises at least one backlit liquid crystal display.

34. The device of claim 33 wherein said at least one liquid crystal display projects said visually adjustable brackets onto a partial mirror intersecting said desired line of sight.

35. The device of claim 32 wherein said adjustable brackets comprise a plurality of substantially linearly disposed, spaced apart, selectively illuminatable elements.

36. The device of claim 35 wherein a first subset of said viewable elements perceived as medial of said left and right sides of said object may be viewed while a second subset of said viewable elements perceived as lateral of said left and right sides of said object are not viewed.

37. The device of claim 35 wherein a first subset of said viewable elements perceived as medial of said left and right sides of said object may be not viewed while a second subset of said viewable elements perceived as lateral of said left and right sides of said object are viewed.

38. The device of claim 35 wherein a first subset of said viewable elements perceived as coincident with said left and right sides of said object may be not viewed, while a second subset of said viewable elements perceived as medial and lateral of said left and right sides of said object are viewed.

39. The device of claim 35 wherein a first subset of said viewable elements perceived as coincident with said left and right sides of said object may be viewed, while a second subset of said viewable elements perceived as medial and lateral of said left and right sides of said object are not viewed.

40. The device of claim 32 wherein said user input device further comprises an alphanumeric keypad for manually entering said selected basal area factor data to said device.

41. The device of claim 32 further comprising:
a switch for indicating to said processor section when said adjustable brackets are aligned with or separated by a distance perceived as less than that between said left and right sides of said face of a selected one of said stand of trees.

42. The device of claim 32 further comprising:
an input port for providing additional data information to said processor section.

43. The device of claim 27 further comprising:
a laser-based distance measuring device coupled to said input port.

44. The device of claim 32 further comprising an output port coupled to said processor section for providing an output signal at least indicative of said selected ones of said stand of trees meeting said selected basal area factor.

45. The device of claim 32 further comprising:
a user viewable readout coupled to said processor section for indicating at least a number indicative of said selected ones of said stand of trees meeting said selected basal area factor.

46. The device of claim 32 further comprising:
a data storage element coupled to said processor for storing at least a number indicative of said selected ones of said stand of trees meeting said selected basal area factor.

* * * * *